United States Patent [19]

Zodrow et al.

[11] Patent Number: 5,055,154

[45] **Date of Patent: * Oct. 8, 1991**

[54] METHOD AND APPARATUS FOR AFFIXING LABELS AND/OR FOILS TO BOTTLES

[76] Inventors: Rudolf Zodrow, Lichtstr. 37, 4000 Dusseldorf, Konstrukteur; Hans-Werner Mohn, Hardenbergstr. 12, 4044 Kaarst 2, Konstrukteur, both of Fed. Rep. of Germany

[*] Notice: The portion of the term of this patent subsequent to Dec. 8, 1999 has been disclaimed.

[21] Appl. No.: 129,763

[22] Filed: Mar. 12, 1980

[30] Foreign Application Priority Data

Apr. 4, 1979 [DE] Fed. Rep. of Germany ....... 2913538

[51] Int. Cl.[5] ............................................. B32B 31/18

[52] U.S. Cl. .................................... 156/256; 156/516; 156/517; 156/521; 156/560; 156/561; 156/568; 156/571

[58] Field of Search ............... 156/521, 560, 561, 568, 156/571, 256, 516, 517

[56] References Cited

U.S. PATENT DOCUMENTS

| | | | |
|---|---|---|---|
| 3,871,943 | 3/1975 | Zodrow | 156/568 |
| 4,079,875 | 3/1978 | Zodrow | 156/568 |
| 4,108,706 | 8/1978 | Brands et al. | 156/568 |

*Primary Examiner*—Caleb Weston

[57] ABSTRACT

A method and an apparatus for fixing members such as labels and foils to bottles wherein cut-to-size members are picked up at pick-up station, glue coated as they are picked up and pressed onto a bottle on their glue coated side. The members are severed from a continuous roll of web material and are individually and successively fed before coating to the pick-up station at the rate at which they are picked-up.

15 Claims, 6 Drawing Sheets

METHOD AND APPARATUS FOR AFFIXING LABELS AND/OR FOILS TO BOTTLES

BACKGROUND OF THE INVENTION

The invention relates to a method and apparatus for affixing labels and/or foils to bottles wherein precut labels and/or foils are picked up at a station, glue-coated on one side as they are being picked up, turned over, and pressed onto the bottles by their glue-coated side. Foil here means any kind of wrap applied to a bottle neck, in other words, not only a wrap which covers the bottle neck and crown cap but also a wrap which covers only the bottle neck and possibly also the rim of the crown cap.

Prior-art labeling and foiling methods can be divided into two groups so far as the transfer of the cut-to-size labels and foils is concerned. In the first of these groups, precut labels and foils are adhered to the bottle simultaneously or successively. An example of such a labeling and foiling apparatus is known from German patent No. 10 14 922. In this the bottles and, as the bottles move on, wrapped around them, pressed onto them, and smoothed.

The second group of labeling and foiling machines is characterized in that foil is pulled and cut discontinuously from a roll, the pieces of foil so cut off being glue-coated and transferred to a gripper cylinder which then presses them onto the circumference of the bottle. Examples of such labeling and foiling machines are known from German patent No. 21 60 212, French patent No. 72 39 096, and German patent applications DOS Nos. 17 86 043 and 15 86 388. The foil is either glue-coated before it is cut off, as in German patent No. 21 60 212, or then the glue is applied after or during the transfer of the cutoff foil to the gripper cylinder, as in German patent application DOS No. 15 86 388 or in French patent No. 72 39 096 and German patent application DOS No. 17 86 043, respectively. With both groups of labeling and foiling machines, the cut-to-size foils can be adhered to the bottle neck also in a diamond fashion.

The second group of labeling and foiling machines offers the advantage over the first group that foiling is cheaper since foil in rolls costs only about half as much as precut foils. On the other hand, a drawback of the second group of labeling and foiling machines is the relative complexity of the apparatus required for taking off, transferring and glue-coating the cut-to-size foils. Separate stations are provided for transferring them to the gripper cylinder and for coating them with glue.

SUMMARY OF THE INVENTION

The object of the present invention is to provide a method and apparatus allowing lengths of foil and/or labels to be cut from a rolled-up web, thus securing the advantage of lower cost over precut foils and/or labels, as in the prior-art apparatuses, while also permitting a space-saving arrangement, dispensing with the need for additional gluing means for the cut-to-size labels and/or foils, and avoiding fouling of the machine through previously glue-coated labels and/or foils. Moreover, the apparatus, like the prior-art apparatuses, is to be suitable for both square and diamond foiling.

With a view to accomplishing this object, it is proposed in accordance with the invention that in a method of the type outlined above the lengths of foil and/or labels cut in known manner from a rolled-up web be fed individually and successively, without being coated with glue, to the pickup station for the foils and/or labels at the rate at which they are picked up by gluing segments. In other words, it is to be possible to cut only lengths of foil from the web and use precut labels, or to cut both lengths of foil and labels from the web, or to cut only labels individually and successively from the web and use precut foils.

In accordance with a preferred embodiment of the method of the invention, foil and/or labels are to be cut from the web as they are being picked up.

For the practice of the method in accordance with the invention, an apparatus is proposed which consists of a pickup station for cut-to-size labels and/or foils past which a gluing and pickup means is movable which cooperates with a gripper cylinder that receives the cut-to-size labels and foils from the gluing and pickup means and presses them onto the bottles, said apparatus being characterized by the following characteristics:

(a) one or more webs of material in roll form;

(b) a means for unwinding the web from the supply roll;

(c) a means for severing a length of material from the web; and (d) foil and/or label boxes for the severed lengths of material disposed in proximity to the path of motion of the gluing and pickup means. The foil and label boxes are preferably disposed one on top of the other.

A further preferred embodiment of the apparatus in accordance with the invention is characterized by:

(a) a gluing and pickup means constructed as a turret driven to rotate and carrying a plurality of gluing segments which are driven to rotate or pivot, are moved past the pickup boxes, and pick up glue from a glue roll rotatably mounted in proximity to the periphery of the turret, and (b) a gripper cylinder which receives the glue-coated labels and the cut-to-size foil from the turret, presses the labels and the foil onto the bottles at the conveying track for the bottles, is driven to rotate about an axis parallel to that of the turret, and is moved past the peripheral surface of the turret as it rotates in the same direction, the gluing segments on the turret being driven to rotate or pivot in a direction opposite to that of the gripper cylinder as the labels and the foil are being transferred.

From one to four groups of gluing segments are preferably disposed on the turret in known manner.

The method and apparatus in accordance with the invention satisfy the above requirements for a space.-saving arrangement, usability of inexpensive foil and/or label material in web form, dispensation with additional gluing means for precut foils, and avoidance of fouling through the use of cut lengths not previously coated with glue.

In a further preferred embodiment of the apparatus in accordance with the invention, a length of foil is severed from the rolled-up foil web as it is picked up by a glue segment, this embodiment being characterized by:

(a) a take-off means which conveys the end of the foil web to the pickup point;

(b) one or more cutting blades which sever the length of foil from the foil web as the length is being picked up by the gluing segments;

(c) a vertical guide between take-off means and pickup station, the lower edge of one of the walls of the guide forming the counterblade; and (d) a support wall for the lower end of the foil web, located at the pickup station.

Blade segments are preferably disposed on a turntable. The blade turntable and the gluing and pickup turret preferably are of the same diameter, are driven at the same speed of rotation but in opposite directions, and carry in the same manner and arrangement blades and gluing segments, respectively, driven to rotate or pivot. The blades are preferably serrated.

This preferred embodiment of the apparatus in accordance with the invention assures good guidance of the foil to be severed from the web at the pickup station and satisfactory transfer of the cut-to-size foil to the gluing segment. In contrast to the severing of a length of foil from a foil web as practiced heretofore, in which the cut-to-size foil undergoes a free fall during which it may become creased or jammed owing to the flimsiness of the material, such creasing or jamming is all but impossible when the length of foil is severed from the web in accordance with the invention by the blade which cooperates with the glue segment as the latter picks up said length of foil.

A preferred embodiment of the apparatus in accordance with the invention is characterized in that the collection and pickup box for the cut-to-size foil is adapted to be moved in unison with the pickup boxes for the labels toward and away from the gluing and pickup means. Because of this common control of the motions of the foil and label boxes there is less likelihood that trouble might develop. The label box is retracted when there is a gap in the bottle feed. At the same time, the foil-web feed is interrupted. In this way, assurance is provided that the support wall for the cut-to-size foil remains free of glue.

To be able to affix the foil either straight or in diamond fashion, the foil take-off and severing means and the foil box or support wall, respectively, in a further preferred embodiment of the invention are rotatable or pivotable between a horizontal or vertical foil-feed position and an oblique position.

BRIEF DESCRIPTION OF THE DRAWINGS

The invention will now be explained in greater detail with reference to the accompanying drawings, wherein.

In the various figures, identical parts are designated by identical reference numerals.

DETAILED DESCRIPTION OF THE INVENTION

Figure 1:
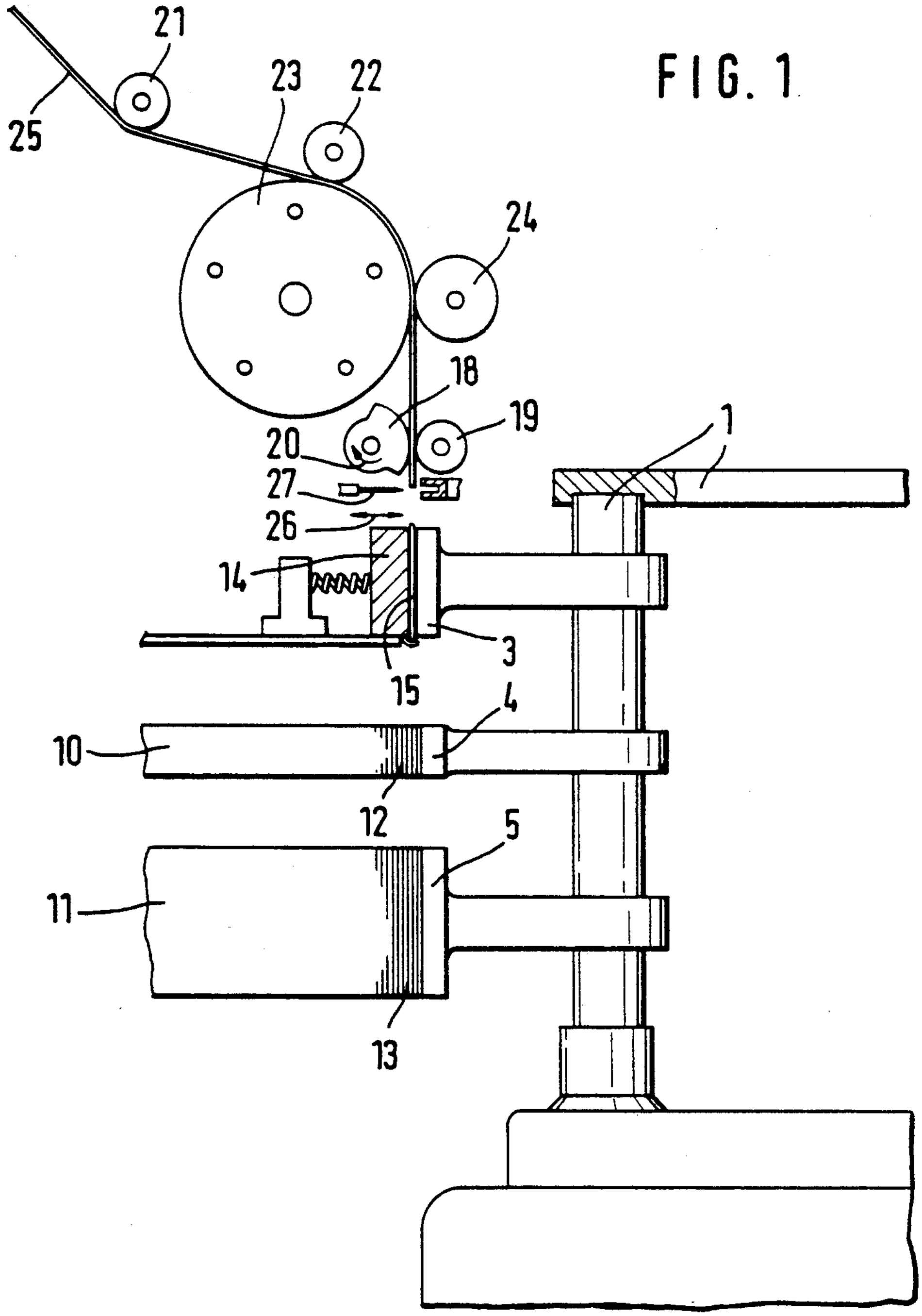
FIG. 1 is an elevation of an embodiment of the apparatus in accordance with the invention.

The embodiment illustrated in FIGS. 1 and 2 comprises a gluing and pickup turret 1, hereinafter referred to simply as turret, which is driven to rotate in the direction indicated by the arrow 2. Three groups of three superposed gluing segments 3, 4 and 5 are disposed on the turret 1 and are driven to rotate or pivot in the direction of the arrow 6 during a revolution of the turret 1. In the course of that revolution, the gluing segments 3, 4 and 5 first make contact with the rotatable glue roll 7, from which they pick up a film of glue. In FIG. 2, this takes place in position 8. As the turret 1 continues to revolve, the glue-coated segments 3, 4 and 5 reach the pickup station 9, where with the aid of the glue film carried by them they pick up from each of the label boxes 10 and 11 a label 12 and 13, and from the foil box 14 a cut-to-size foil 15, which during the further rotation of the turret 1 they transfer to the gripper cylinder 16 at position 17.

Figure 2:
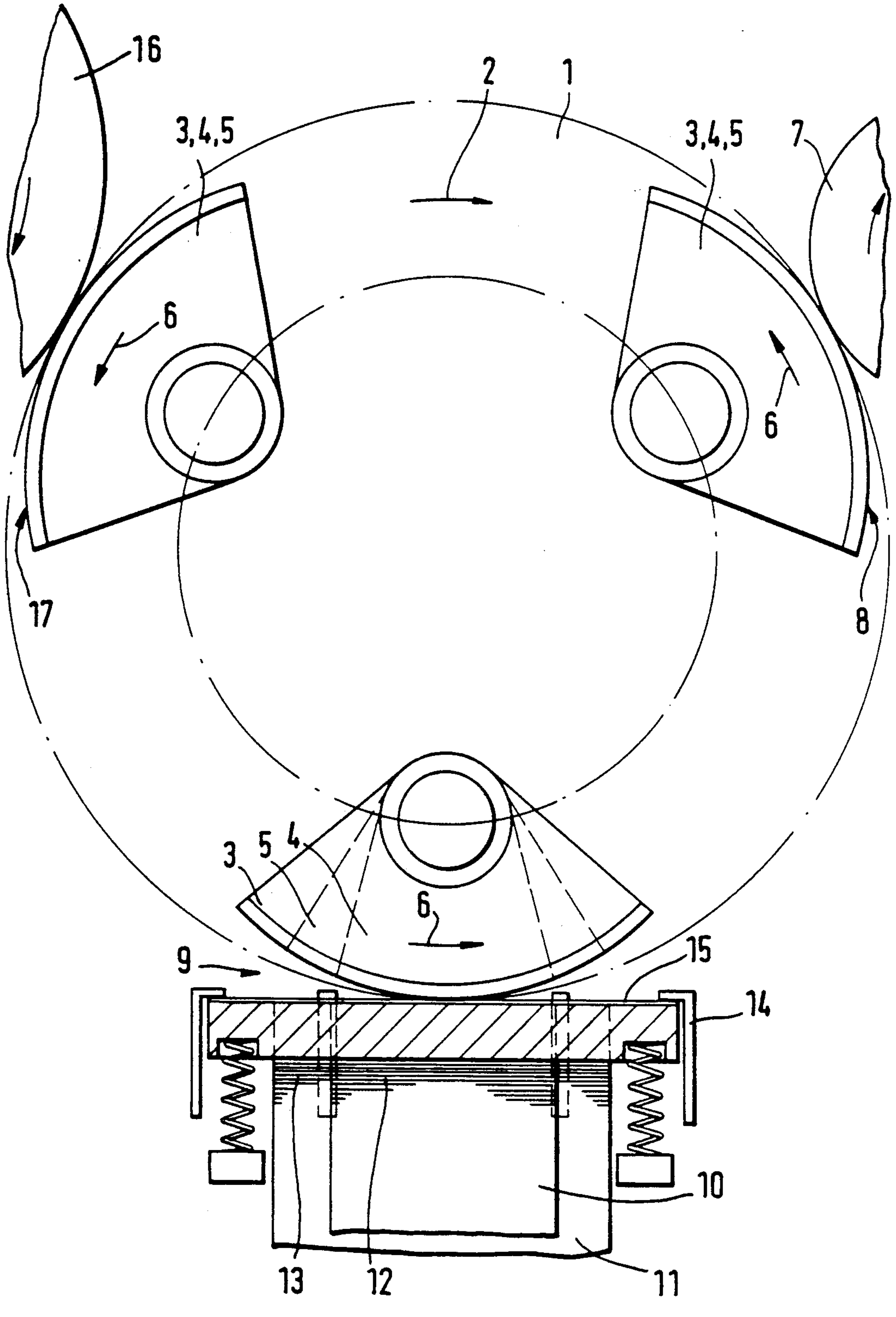
FIG. 2 is a top view of the apparatus of FIG. 1.

Disposed above the foil box 14, as is apparent particularly from FIG. 1, is the take-off means consisting of the rolls 18 and 19, of which at least one, 18, is driven to rotate in the direction of the arrow 20, and which conduct the foil web 25, which passes over the guide rolls 21, 22, 23 and 24, downwardly into the foil box 14. The foil web 25 is cut by a blade 27 which reciprocates in the directions of the arrows 26, a cut-to-size foil 15 then dropping into the foil box 14 in the position shown in FIG. 1, from which it is picked up by the upper glue-coated gluing segment 3 at the pickup station 9. Since three groups of gluing segments 3, 4 and 5 are provided, and since their motion runs counter to the direction of rotation of the turret 1 in the pickup and transfer of the cut-to-size foil 15 and of the labels 12 and 13, a sufficient interval of time is provided for delivery of the cut-to-size foil 15 to the pickup station 9 even when a high production rate is maintained.

Figure 3:
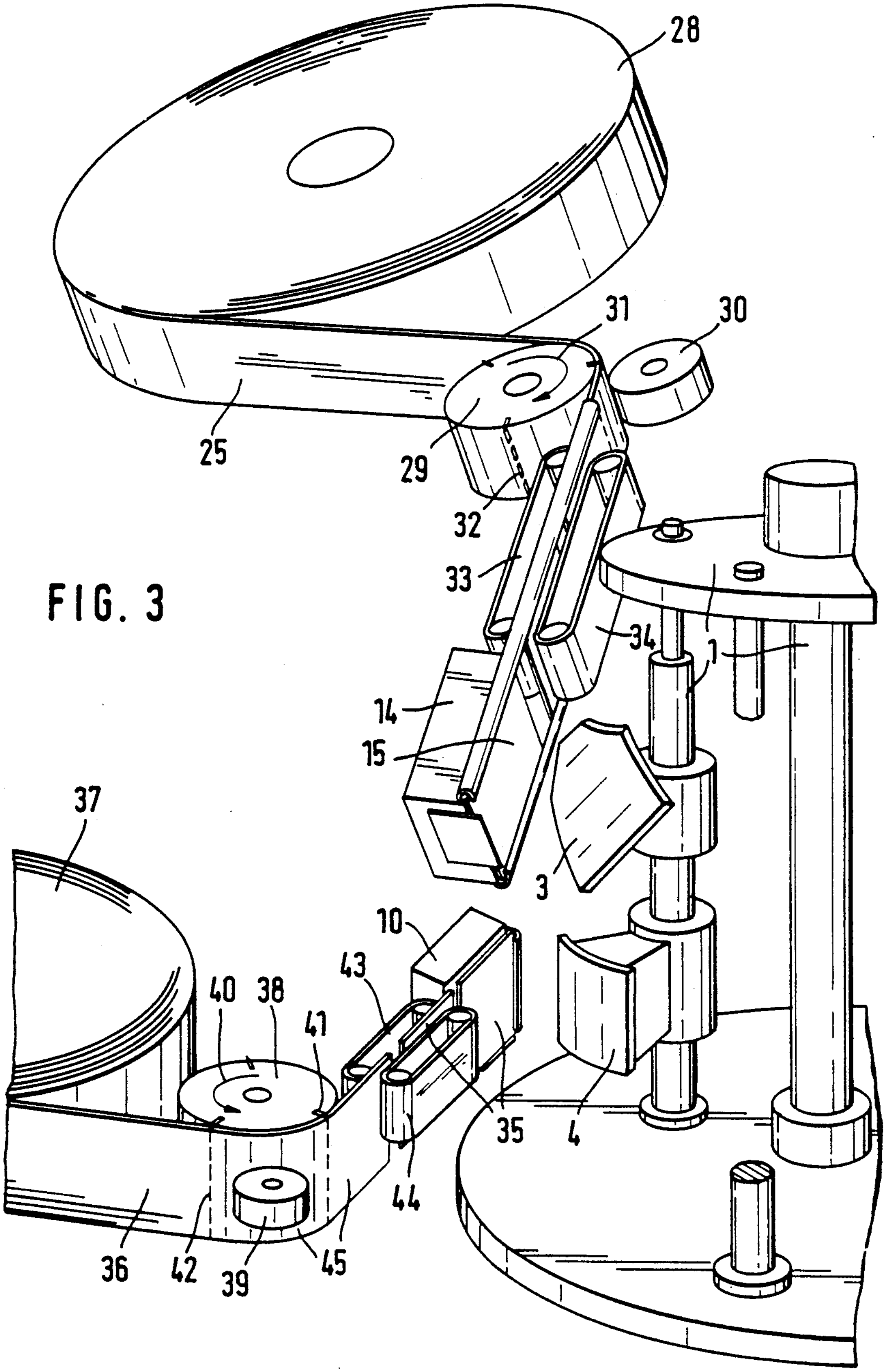
FIG. 3 is a perspective view of a further embodiment of the apparatus in accordance with the invention.

In the embodiment shown in FIG. 1, precut labels 12 and 13 are used. FIG. 3 illustrates a modified embodiment in which both foil and label are pulled from a web in roll form, individually cut off, successively fed to the pickup station, and there transferred. Oblique feed of the cut-to-size foils 15 permits peaked, or diamond-style, foiling. When the feeding means for the cut-to-size foils 15 are pivotably mounted, it becomes possible to place the latter either squarely or in diamond fashion on the gluing segments 3 and to adhere them to the bottle neck in a corresponding position.

The foil web 25 is wound to form a supply roll 28 and is conducted obliquely downward between the take-off rolls 29 and 30, at least one of which is driven to rotate in the direction of the arrow 31. The roll 29 is provided with at least one perforating blade 32 which perforates the foil web 25 at intervals. Through the pair of endless belts 33 and 34 which follow the take-off rolls 29 and 30 and run faster than the latter, the last perforated length of the foil web 25 is torn off and fed as an individual cut-to-size foil 15 to the foil box 14. From the latter it is picked up by the gluing segment 3.

In the same manner, cut-to-size labels 35 are individually and successively fed to the label box 10 in the embodiment according to FIG. 3. The label web is wound to form a supply roll 37 from which it is unwound by means of the take-off rolls 38 and 39, at least one of which is driven to rotate in the direction of the arrow 40. As it is unwound, the label web 36 is provided at intervals with perforations 42 by at least one perforating blade 41 fixed to the roll 38. The endless belts 43 and 44 which follow the rolls 38 and 39 and run faster than these rolls then tear off the last perforated length 45 of label web and convey it as a cut-to-size label 35 to the label box 10, from which it is picked up by the gluing segment 4.

Figure 4:
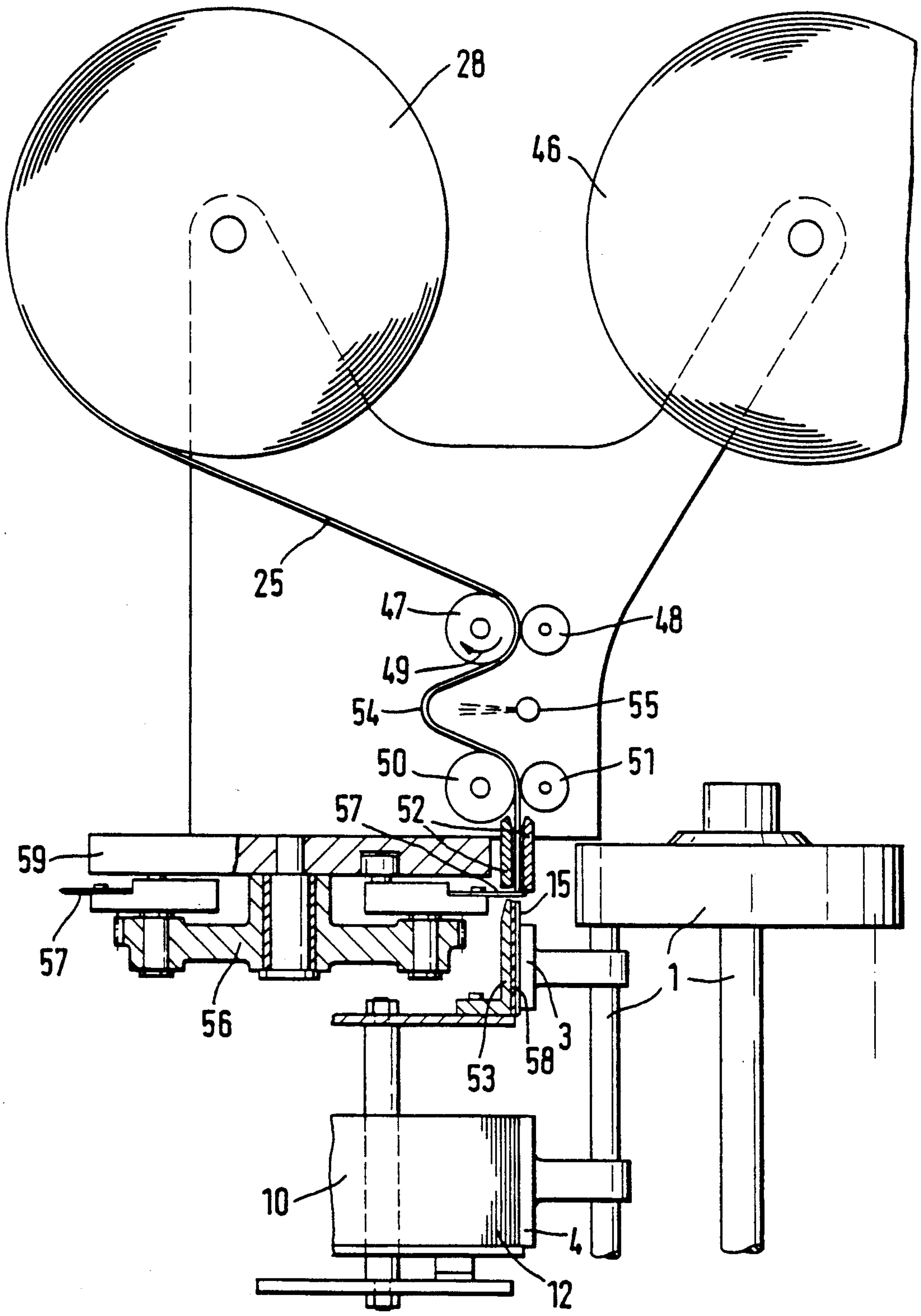
FIG. 4 is an elevation, partly in section, of a further embodiment of the apparatus in accordance with the invention.
Figure 5:
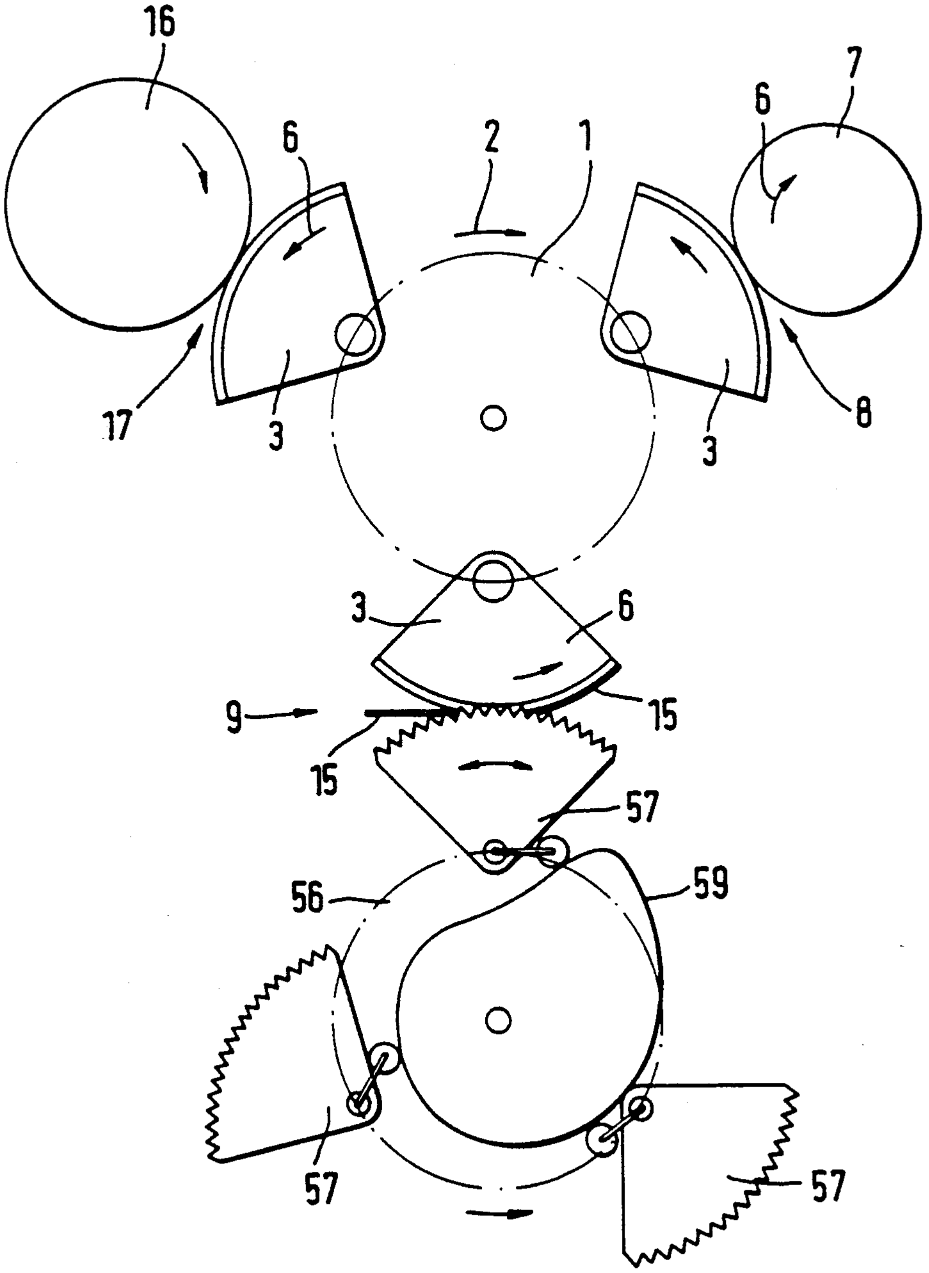
FIG. 5 is a top view of the apparatus of FIG. 4.

In the embodiment illustrated in FIGS. 4 and 5, the foil web 25 is unwound from a supply roll 28, a reserve roll 46 being provided to permit changeover. Through the take-off rolls 47 and 48, at least one of which is driven to rotate in the direction of the arrow 49, the foil web 25 guided between them is continuously pulled off the roll 28, the conveying path of the roll 47 corresponding to the prescribed length of the cut-to-size foil 15. A second pair of take-off rolls 50 and 51 is driven to rotate intermittently in such a way that it advances the foil web 25 in the time interval between two pickup operations. The web is then conveyed vertically downward through the guide 52 to a point in front of the support wall 53. The foil-web loop 54 which forms between the rolls 47 and 48 and the rolls 50 and 51 while the latter are idle is stabilized by means of either a spring- or weight-loaded rocker or, as shown in FIG. 4, an air nozzle 55.

Figure 6:
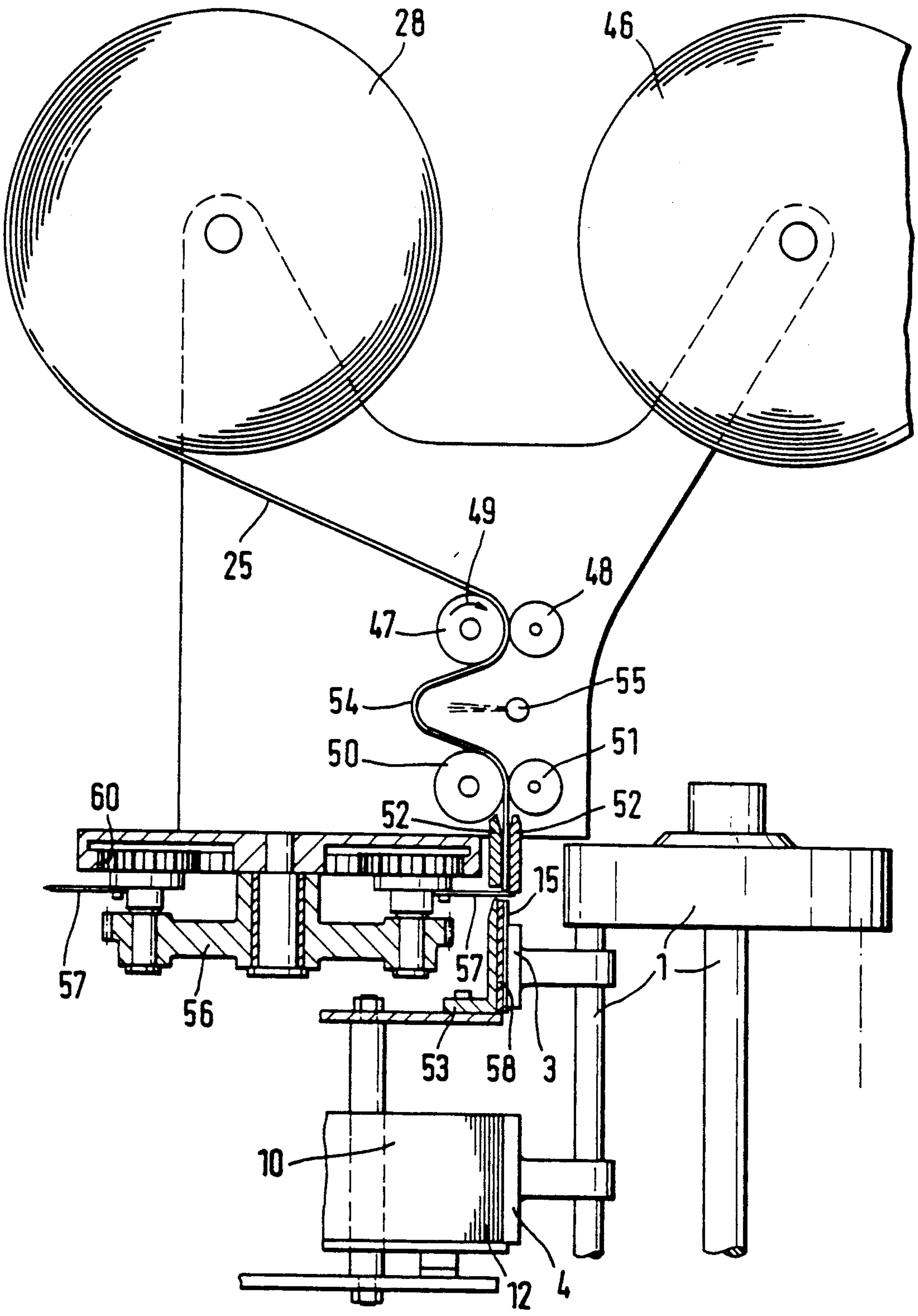
FIG. 6 is an elevation, partly in section, of an embodiment representing a modification, with respect to the drive of the blades, of that shown in FIG. 4.

The severing of the length of foil 15 from the foil web 25 in the embodiment according to FIGS. 4 to 6 occurs simultaneously with its pickup by the gluing segment 3. Particularly well suited for severing is a blade arrangement as most readily apparent from FIG. 5. On a turntable 56 whose dimensions correspond to those of the turret 1 and which is driven to rotate in a direction opposite to that of the turret 1, cutting-blade segments 57 resembling the gluing segments 3 are rotatably or pivotably mounted in the same arrangement as the gluing segments on the turret 1.

As the cut-to-size foil 15 is being picked up by the gluing segment 3, the support wall 53, which may be lined with a resilient layer 58, performs the function of the label stack. The length of foil 15 is severed by the cutting-blade segments 57 as the foil 15 is picked up by the gluing segment 3 at the pickup station 9, as is most readily apparent from FIG. 5. The lower edge of one of the walls of the guide 52 then serves as counterblade.

The motions of the gluing segments 3 and of the cutting-blade segments 57 in the pickup and cutting positions, respectively, are symmetrical. The motion of the cutting-blade segments 57 may be controlled either through a fixed cam 59 (FIG. 5) or a planetary gear train 60 (FIG. 6).

As in the embodiment according to FIG. 3, described earlier, the entire take-off and cutting arrangement for the length of foil 15 can be pivotably mounted to permit foiling in diamond fashion.

It will be appreciated that the instant specification and claims are set forth by way of illustration and not limitation, and that various changes and modifications may be made without departing from the spirit and scope of the present invention.

What is claimed is:

1. In a method for affixing member such as labels and foils to bottles wherein cut-to-size members are picked up by pick-up elements at a station, glue-coated as they are picked up, turned over, and pressed onto a bottle by their glue-coated side, the improvement wherein the pick-up station is rotationally stationary and and presents a planar pick-up surface and further comprising severing the members from a continuous roll of web material and individually and successively feeding the severed members, before coating, to the planar surface of the stationary pick-up station in unison with and at the rate at which the pick-up elements pass the pick-up station to pick up the severed members.

2. A method according to claim 1, wherein the members are severed from the web as they are picked up.

3. In an apparatus for affixing members such as labels and foils to bottles, having a stationary pick-up station, rotatable means movable past the pick-up station for picking up cut-to-size members and glue-coating the members as they are picked up and cooperative with gripping means for conveying the members to bottles and pressing the members thereon, the improvement comprising: means receptive of the members in a continuous roll of web material for severing the cut-to-size members from the continuous roll and means for individually and successively feeding the severed cut-to-size members to the pick-up station and thereby to the gluing and pickup means at the rate at which they are picked up, wherein the feeding means comprises at least one supply roll of web material and means for unwinding the web from the supply roll, and wherein the pick-up station comprises at least one box for the severed members disposed in proximity to the path of motion of the gluing and pickup means.

4. The apparatus according to claim 3 comprising a foil box and at least one label box all disposed one on top of the other.

5. The apparatus according to claim 3 or claim 4, wherein the gluing and pickup means comprises a rotationally driven turret, a plurality of gluing segments mounted for rotatory movement on the turret past each pickup box and a glue roll rotatably mounted in a fixed location in proximity to the periphery of the turret for applying glue to the segments before passing each pick-up box, and wherein the gripping means comprises a gripper cylinder which receives glue-coated cut-to-size members from the turret for pressing same onto the bottles, the gripper cylinder being rotatably driven about an axis parallel to that of the turret and is moved past the peripheral surface of the turret as it rotates in the same direction as the latter, the gluing segments on the turret being driven to rotate in a direction opposite to that of the gripper cylinder as the members are being transferred.

6. The apparatus according to claim 5, comprising from one to four groups of gluing segments on the turret.

7. The apparatus according to claim 3, wherein the severing means includes means for severing the members from the web as they are picked up.

8. The apparatus according to claim 7, wherein the means for severing the members as they are picked up comprises: take-off means for conveying the end of the web to the pickup means, at least one cutting blade for severing a length of members from the web as said length is being picked up by the gluing and pickup means, a vertical guide between the take-off means and the pickup means having a lower edge forming a counterblade for said cutting blade and a support wall for the lower end of the web located at the pickup means.

9. The apparatus according to claim 8, further means mounting the cutting blades for rotation about an axis parallel to the longitudinal axis of the guided web.

10. The apparatus according to claim 9, wherein the means mounting the blades comprises a rotatable turntable and the pick up means comprises a rotatable turret having the same diameter as the turntable and rotatable gluing segments thereon, means closing the turntable and turret at the same speed of rotation but in opposite directions and wherein the cutting blades and wherein the members and locations of segments and blades are the same.

11. The apparatus according to claim 10, further comprising a box for the severed members and means mounting the support wall and box in unison for movement toward and away from the turret.

12. The apparatus according to claim 8, wherein each cutting-blade is serrated.

13. The apparatus according to claim 3 or claim 7, further comprising means mounting the severing means and the feeding means for movement between one of a horizontal and vertical feed position and an oblique position.

14. In a method for affixing members such as labels and foils to bottles wherein cut-to-size members are picked up at a station by rotating gluing and pickup means, glue-coated as they are picked up, turned over, and pressed onto a bottle by their glue-coated side, the improvement comprising: providing at least one supply roll of web material, unwinding the web from the supply roll, severing the members from the roll of web material and individually and successively feeding the severed members before coating to at least one box disposed in proximity to the path of motion of the gluing and pickup means at the rate at which they are picked up.

15. A method according to claim 14, wherein the members are severed from the web as they are picked up.

* * * * *

UNITED STATES PATENT AND TRADEMARK OFFICE

CERTIFICATE OF CORRECTION

PATENT NO. : 5,055,154

DATED : October 8, 1991

INVENTOR(S) : Zodrow et al.

It is certified that error appears in the above-identified patent and that said Letters Patent is hereby corrected as shown below:

Col. 5, line 51 Delete " member " and substitute -- members --

Col. 5, line 56 Delete " and " (second occurrence)

Signed and Sealed this

Twenty-third Day of November, 1993

Attest:

BRUCE LEHMAN

Attesting Officer

Commissioner of Patents and Trademarks